(12) United States Patent
Mackey et al.

(10) Patent No.: US 11,308,309 B2
(45) Date of Patent: Apr. 19, 2022

(54) FINGERPRINT SENSOR HAVING AN INCREASED SENSING AREA

(71) Applicant: SYNAPTICS INCORPORATED, San Jose, CA (US)

(72) Inventors: Bob Lee Mackey, Santa Clara, CA (US); Joseph Kurth Reynolds, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/707,887

(22) Filed: Dec. 9, 2019

(65) Prior Publication Data

US 2020/0184185 A1 Jun. 11, 2020

Related U.S. Application Data

(60) Provisional application No. 62/777,577, filed on Dec. 10, 2018.

(51) Int. Cl.
*G06K 9/00* (2022.01)
*G06F 3/041* (2006.01)

(52) U.S. Cl.
CPC ....... *G06K 9/00046* (2013.01); *G06F 3/0412* (2013.01)

(58) Field of Classification Search
None
See application file for complete search history.

(56) References Cited

U.S. PATENT DOCUMENTS

| 2007/0109438 | A1* | 5/2007 | Duparre | G02B 13/0055 348/335 |
| 2010/0092047 | A1* | 4/2010 | Yamamoto | G06K 9/00046 382/124 |
| 2017/0261650 | A1* | 9/2017 | Powell | G02B 3/0062 |
| 2017/0270342 | A1* | 9/2017 | He | G06F 21/32 |
| 2018/0012069 | A1* | 1/2018 | Chung | G06K 9/2036 |
| 2019/0377858 | A1* | 12/2019 | He | G06K 9/0002 |
| 2020/0285345 | A1* | 9/2020 | Xiang | G06K 9/00046 |

* cited by examiner

*Primary Examiner* — Nicholas J Lee
(74) *Attorney, Agent, or Firm* — Leydig, Voit & Mayer, Ltd.

(57) ABSTRACT

A fingerprint sensing device having an image sensing device and configured to detecting fingerprint data of an input object. The image sensing device includes a plurality of lenses, and a plurality of sensing elements. The plurality of sensing elements includes a first sensing element has a field of view associated with a first lens of the plurality of lenses and laterally offset from a center of the first lens, and a second sensing element has a field of view associated with a second lens of the plurality of lens and laterally offset from a center of the second lens. Further, a processing system may be coupled to the image sensing device and operate the image sensing device to acquire fingerprint image to authenticate a user.

20 Claims, 9 Drawing Sheets

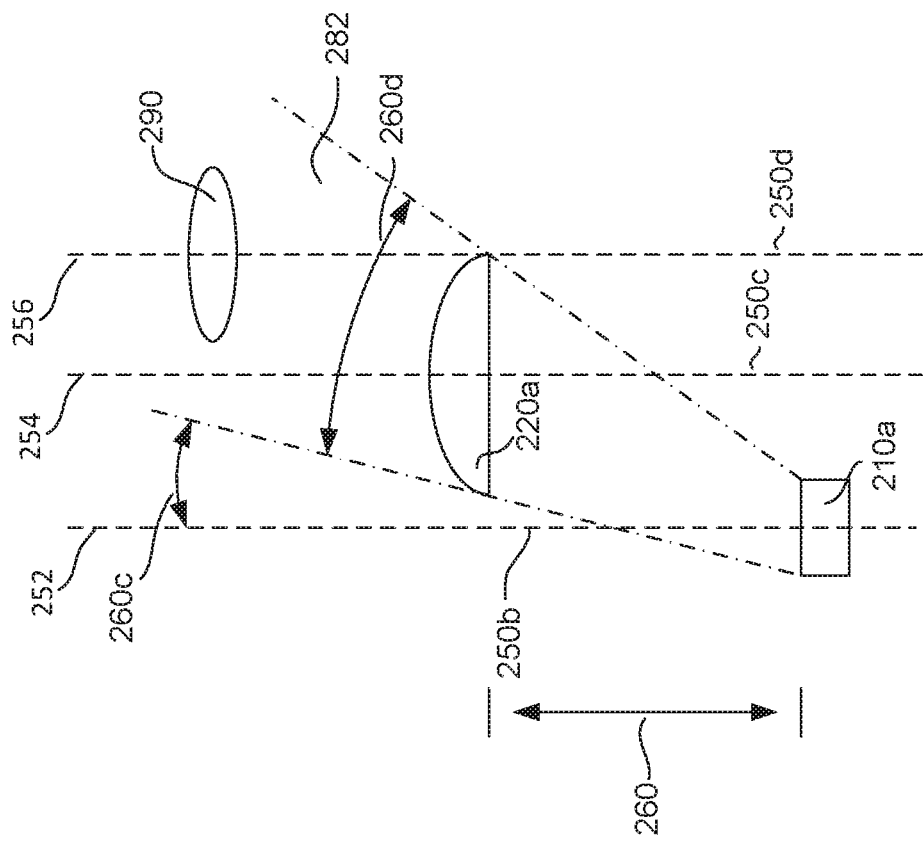
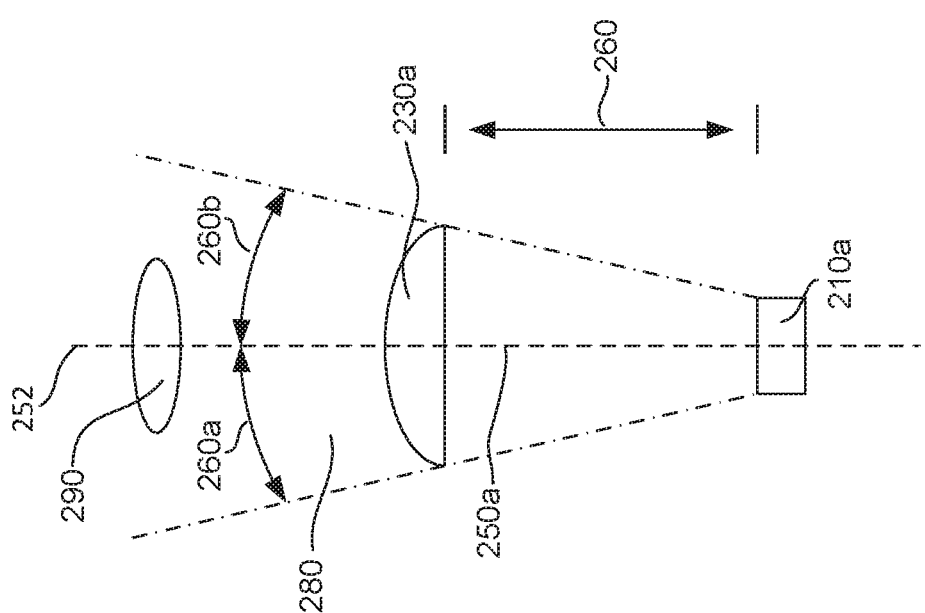
Figure 2C
Figure 2B

FINGERPRINT SENSOR HAVING AN INCREASED SENSING AREA

CROSS-REFERENCE TO RELATED APPLICATIONS

This application claims priority to U.S. provisional patent application Ser. No. 62/777,577, filed Dec. 10, 2018, which is incorporated by reference herein in its entirety.

BACKGROUND

Field

Embodiments disclosed herein generally relate to electronic devices, and more specifically, to input devices including fingerprint sensors.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

SUMMARY

In one embodiment, a fingerprint sensor comprises an image sensing device having a plurality of lenses, and a plurality of sensing elements. A first sensing element has a field of view associated with a first lens of the plurality of lenses and laterally offset from a center of the first lens, and a second sensing element has a field of view associated with a second lens of the plurality of lens and laterally offset from a center of the second lens.

In one embodiment, an input device comprises a display device and a fingerprint sensor. The display device comprises a plurality of light emitting diodes (LEDs). The fingerprint sensor comprises an image sensing device having a plurality of lenses and a plurality of sensing elements. A first sensing element has a field of view associated with a first lens of the plurality of lenses and laterally offset from a center of the first lens, and a second sensing element has a field of view associated with a second lens of the plurality of lens and laterally offset from a center of the second lens.

In on embodiment, a method for operating a fingerprint sensor comprises acquiring sensor data from an image sensing device of the fingerprint sensor. The image sensing device comprises a plurality of lenses, and a plurality of sensing elements. A first sensing element has a field of view associated with a first lens of the plurality of lenses and laterally offset from a center of the first lens, and a second sensing element has a field of view associated with a second lens of the plurality of lens and laterally offset from a center of the second lens.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 2B illustrates a sensing element of a fingerprint sensing device, according to one or more embodiments.

FIG. 2C illustrates a sensing element of a fingerprint sensing device, according to one or more embodiments.

Figure 1A:
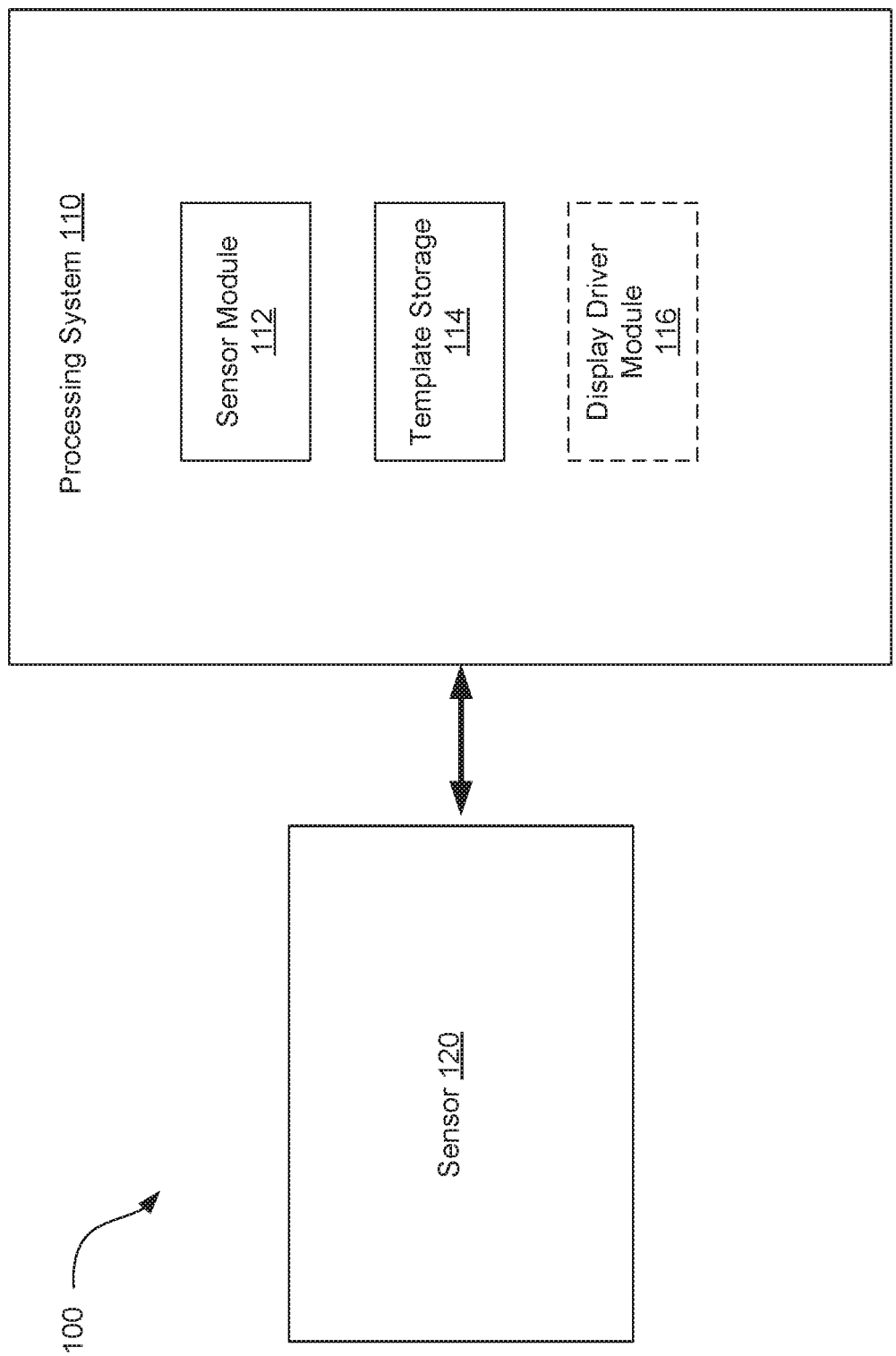
FIG. 1A is a schematic block diagram of fingerprint sensing device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

In various embodiments, fingerprint sensor devices include an imaging device configured to obtain images of a user's fingerprint. Fingerprint sensing devices typically sense fingerprints of fingers that are positioned within the sensing region of the fingerprint sensor device. In many instances, the size of the fingerprint sensing region corresponds to the size of the imaging device of the fingerprint sensing device. Accordingly, to increase the size of the sensing region, the size of the imaging device is also increased. However, as the size of the imaging device is increased, the cost of the fingerprint sensor also increases. In the following, various systems methods for increasing the size of sensing region of the fingerprint sensor without increasing the area of the image device are described. Such methods provide for fingerprint sensing devices having larger sensing areas without significantly increase the cost of the fingerprint sensing devices.

FIG. 1A illustrates a fingerprint sensing device 100. The fingerprint sensing device 100 includes sensor 120 and processing system 110. The fingerprint sensing device 100 may utilize one or more various electronic fingerprint sensing methods, techniques and devices to capture a fingerprint image of a user's finger or fingers. In various embodiments, fingerprint sensing device 100 may be configured to acquire fingerprint images of a user's fingerprint for authentication of the user. For example, fingerprint sensing device 100 may use the fingerprint images to grant or reject a user's access to a computing device, e.g., a mobile phone, a tablet, a laptop, a personal computer, or the like.

Sensor 120 may be any sensing device configured to acquire an image. In one embodiment, the sensor 120 is an imaging device such as a camera. For example, the sensor 120 may be a complementary metal-oxide semiconductor (CMOS) imaging sensor. The sensor 120 may comprise one or more sensing elements configured to optically capture input data. For example, the sensor 120 may include a plurality of pixels configured to receive reflected light from an input object. In one embodiment, the reflected light corresponds to light that is reflected, transmitted or scattered by features of a user's fingerprint. For example, the reflected light may corresponds to light that is reflected by valleys and/or ridges of a fingerprint. In various embodiments, while fingerprints are mentioned, fingerprint sensing device 100 may be configured to determine "prints" from other types of input objects. For example, the fingerprint sensing device 100 may be configured to determine a print of a user's palm. In other embodiments, other types of input objects may be imaged and processed by the fingerprint sensing device 100. Throughout this document, where fingerprints are mentioned, palm prints and/or prints of other types of input objects may be used in as an alternative. Further, in one or more embodiments, a print may correspond to an image of a contact surface.

In one or more embodiments, the sensor 120 may utilize principles of direct illumination of the input object, which may or may not be in contact with an input surface of the sensing area depending on the configuration. One or more light sources and/or light guiding structures may be used to direct light to the sensing region or light may be transmitted through an input object one or more other light sources. When an input object is proximate to the sensing area, light is reflected from surfaces of the input object, which reflections can be detected by the sensing elements of sensor 120 and used to determine fingerprint information or other types of biometric information about the input object. "Fingerprint information" may include fingerprint features such as ridges and valleys and in some cases small features such as pores. Further, fingerprint information may include whether or not an input object is in contact with the input device.

Figure 1B:
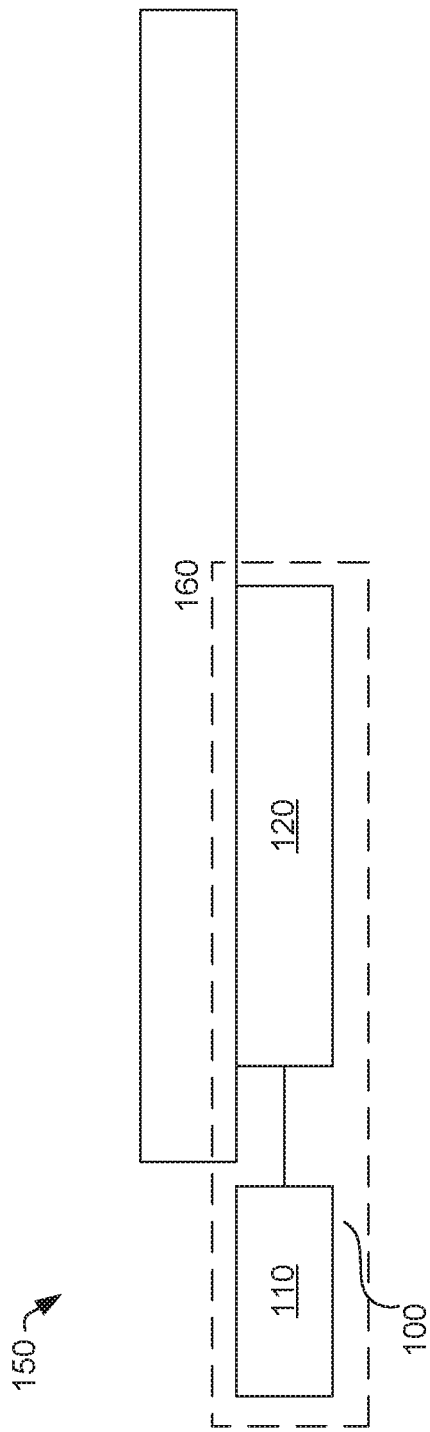
FIG. 1B is a schematic block diagram of an electronic device, according to one or more embodiments.

FIG. 1B illustrates an electronic device 150. The electronic device 150 may be a computing device such as a mobile phone, tablet, laptop, personal computer, or the like. As is illustrated, electronic device 150 includes a display device 160 and the fingerprint sensing device 100. In some embodiments, the sensor 120 is configured to detect input objects over at least part of an active area of the display of the display device 160. The active area of the display may correspond to an area of the display where images are displayed. The display device 160 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The display device 160 may also be flexible or rigid, and may be flat, curved, or have other geometries. In one embodiment, the display device 160 may include a glass or plastic substrate for TFT circuitry and/or other circuitry, which may be used to provide visuals and/or provide other functionality. The display device 160 may also include a cover layer disposed above display circuitry which may also provide an input surface for sensor 120. The cover layer may include a cover lens, sometimes referred to as a cover glass, or lens. Example cover lens materials include optically clear amorphous solids, such as chemically hardened glass, as well as optically clear crystalline structures, such as sapphire, glass, plastic, etc.

In one embodiment, the sensor 120 may be coupled to display device 160. For example, sensor 120 may be coupled to display device 160 through one or more adhesive layers. In other embodiments, the sensor 120 may be disposed on a substrate which is then attached to the display device 160. In other embodiments, sensor 120 may be coupled to a frame of the electronic device 150 disposed below display device 160.

Returning now to FIG. 1A, the processing system 110 is electronically coupled to sensor 120 and is configured to control sensor 120 to acquire sensor data which may be utilized to generate fingerprint images. The processing system 110 includes sensor module 112 and template storage 114. In various embodiments, the processing system 110 includes optional display driver module 116. The processing system 110 may be configured to instruct the sensor 120 to capture sensor data, process the sensor data to generate one or more fingerprint images, and authenticate a user by matching the fingerprint images with one or more templates stored within the template storage 114. The processing system 110 comprises parts of, or all of one, or more integrated circuits (ICs) and/or other circuitry components.

The sensor module 112 may include sensing circuitry, and may be configured to communicate one or more control signals to sensor 120, instructing sensor 120 to acquire sensor data, and/or receive the sensor data from sensor 120. In one embodiment, sensor module 112 may be configured to process the sensor data, and generate fingerprint images which may be used for user authentication.

The template storage 114 comprises at least one non-transient computer-readable storage media. The template storage 114 is generally configured to store enrollment views, such as user templates, for fingerprint images for a user's fingerprint. The template storage 114 may further be configured for long-term storage of information. In some examples, the template storage 114 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

In one embodiment, sensor module 112 compares fingerprint images generated from sensor data received with sensor 120 with user templates stored within template storage 114 to determine whether or not to authenticate a user. When a user is authenticated, the user may be provided with access to an electronic device, such as the electronic device 150. The sensor module 112 may be also configured to generate user templates from sensor data received with sensor 120 and store the user templates within the template storage 114.

The display driver module 116 includes display driver circuitry and is configured to control updating of the display of display device 160. For example, the display driver module 116 may drive update signals onto the display of display device 160 to update an image displayed on the display. The display driver module 116 may include one or more source drivers, a display timing controller, and/or gate selection circuitry which may be used to receive display data, generate display update signals, and drive the display update signals onto the display to update the display. In one embodiment, the display driver module 116 may drive one or more OLED pixels to provide illumination for sensor 120.

Figure 2A:
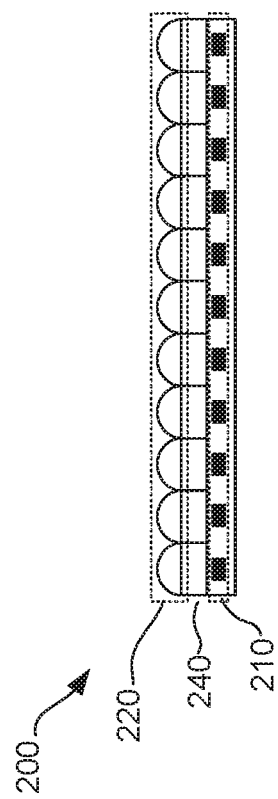
FIG. 2A illustrates a fingerprint sensing device, according to one or more embodiments.

FIG. 2A illustrates an example of image sensing device 200 of a fingerprint sensing device, such as fingerprint sensing device 100. As illustrated, the image sensing device 200 includes sensing elements 210, lenses 220 and collimator filter layer 240. In one embodiment, the image sensing device 200 is a CMOS imager, and the sensing elements are the photodetectors, e.g., photodiodes, of the CMOS imager. The image sensing device 200 may include one or more additional layers, such as, one or more filter layers. In one embodiment, the image sensing device 200 includes one or more infrared (IR) filter layers disposed between the sensing elements 210 and the lenses 220.

In one embodiment, sensing elements 210 are configured to convert light into a current signal. The sensing elements may be referred to as photodiodes. In one or more embodiments, sensing elements 210 are disposed in an array on a substrate of the image sensing device 200. Further, the sensing elements 210 may be disposed as a matrix of pixels that may be controlled via select and readout lines to capture light and output the corresponding current signals. For example, each sensing element is coupled to a select line to active the sensing element for sensing and a readout line, to output the current signal to an amplifier. The amplifier converts the current signal into a voltage signal. The amplifiers and/or other readout circuitry, e.g., analog-to-digital converters, multiplexers, and the like, may be disposed within an integrated circuit of sensor 120 or within sensor module 112.

Lenses 220 are disposed above the sensing elements 210 and function to focus light onto corresponding sensing elements. The lenses 220 may be disposed in a two dimensional array. In the illustrated embodiment, each lens is disposed above one of sensing elements 210. In other embodiments, at least one lens is disposed above two or more sensing elements 210. Lenses 220 may be lenticular lenses or diffractive lenses. In one embodiment, lenses 220 may be configured to reflect light onto sensing elements 210. In such a reflective embodiment, lenses 220 are disposed below sensing elements 210 such that the sensing elements are between the sensing surface and the lenses.

Lenses 220 may be microlenses having a diameter of less of between about 10 μm to about 1 mm. In one embodiment, the lenses 220 may be comprised of a single element or multiple elements. Further, the lenses 220 may have a convex surface configured to refract light. In some embodiments, the lenses 220 may have a variation of refractive indexes, e.g., a gradient, which is configured to refract light. In one or more embodiments, both the shape of a lens and a variation of refractive indexes of the lens may be used to refract line. In various embodiments, the lenses 220 may include concentric curved surfaces that are configured to refract light. In yet other embodiments, lenses 220 may include grooves having stepped or multi-levels that approximate an ideal shape of the lenses. In embodiments employing diffractive lenses, the diffractive lenses may diffract the light holographically to approximate the effect of refractive lenses.

Collimator filter layer 240 is disposed between lenses 220 and sensing elements 210 and prevents crosstalk between each of the sensing elements 210. Collimator filter layer 240 may be configured to condition light using an array of apertures, also referred to collimator holes, collimator filter holes, collimator vias, or holes. In one embodiment, the collimator filter layer 240 only allows light rays reflected from an input object, such as a finger, a palm or other types of input object, at normal or near normal incidence to the collimator filter layer 240 to pass and reach the sensing elements 210. In one embodiment, the collimator filter layer 240 is an opaque layer with an array of holes. Further, the collimator filter layer 240 may be laminated, stacked, or built directly above sensing elements 210. In one embodiment, collimator filter layer 240 may be made of plastic materials, such as polycarbonate, polyethylene terephthalate (PET), polyimide, carbon black, inorganic isolating or metallic materials, silicon, or SU-8. In one or more embodiments, collimator filter layer 240 is monolithic.

The field of view of each sensing element 210 corresponds to at least one of the features of a corresponding lens and a position of a sensing element relative to the lens. In one embodiment, the position of the sensing elements 214 relative to lenses 220 may to alter the field of view of each sensing element 210. For example, as illustrated in FIG. 2A, sensing elements 214 are laterally offset from a corresponding one of lenses 222 in the X direction.

In one embodiment, sensing element 210 and lenses 220 are configured generate a field of view that extends laterally beyond one or more edges of the image sensing device 200. Laterally expanding the field of view of the image sensing device 200 expands the sensing area of image sensing device 200 well beyond the boundaries of the image sensing device. Accordingly, the sensing area of the fingerprint sensor, e.g., fingerprint sensing device 100, is also expanded, while the size of the image sensing device 200 is not substantially increased.

In one embodiment, laterally altering the center of an optical axis of a lens relative to the center of the sensing element varies the field of view of the sensing element in the X direction. Further, an optical axis that is laterally off-center with regard to the center of the sensing element bends light from off-axis field angles into the field of view of sensing element. In various embodiments, by laterally moving the optical axis of the lens further away from the center of the sensing element, the field of view of the sensing element is altered in a similar direction, such that a location of an object at the center of the field of view for the sensing element is off-center from the center axis of the sensing element.

FIG. 2B illustrates sensing element 210a, lens 220a, and input object 290. Sensing element 210a comprises field of view 230a which corresponds to the difference between the center of the sensing element 210a and the center of lens 220a. In the embodiment illustrated by FIG. 2B, the center of the sensing element 210a and the center of the center of the lens 220a are the same, e.g., center line 250, thus the center of field of view 280 is also about the center line 250. Accordingly, an input object, e.g., input object 290, that is centered along center line 250, will be at the center of the field of view 280 and also located along the center of sensing element 210.

Similar to the embodiment of FIG. 2B, the embodiment of FIG. 2C illustrates sensing element 210a, lens 220a, input object 290 and the center for each element, e.g., center line 252, center line 254, and center line 256. However, in the embodiment of FIG. 2C, center line 252 of sensing element 210*a* differs from center line 254 of lens 220*a*, and accordingly, field of view 282 of FIG. 2B differs from field of view 280 of FIG. 2A. Lens 220*a* has been shifted such that it is laterally off-center from sensing element 210*a* in the embodiment of FIG. 2B, and accordingly, field of view 282 differs angularly from field of view 280. For example, the boundaries of field of view 280 correspond to angles 260*a* and 260*b* with reference to center line 250, e.g., the center of sensing element 210*a*. Comparatively, the boundaries of field of view 282 correspond to angles 260*c* and 260*d* with reference to center line 250*b* of sensing element 210*a*. Angles 260*a* and 260*b* may be substantially similar in magnitude, such that field of view 280 is centered along center line of 250*a*. However, angles 260*c* and 260*d* differ from each other in magnitude, and accordingly field of view 282 is not centered along center line 250*b*. Further, while one of angles 260*a* and 260*b* is positive and the other is negative, both of angles 260*c* and 260*d* are either positive or negative. Moreover, in the embodiment of FIG. 2C, input object 290 is no longer centered along the center of sensing element 210*a*. For example, input object 290 is laterally offset from center line 250*b*; however, as center line 250*c* of lens 220 is also offset from center line 252, lens 220 functions to center input object 290 along center line 250*b* of sensing element 210*a*, as illustrated in the embodiment of FIG. 2C. In one embodiment, center line 250*b* of sensing element 210*a* may be offset from center line 250*c* of lens 220 by at least about 1 um. In other embodiments, center line 250*b* of sensing element 210*a* may be offset from center line 250*c* of lens 220 by no more than about 5 μm. In one embodiment, field of view 280 may be varied by changing the distance between lens 220*a* and sensing element 210*a*, e.g., distance 260.

Figure 2D:
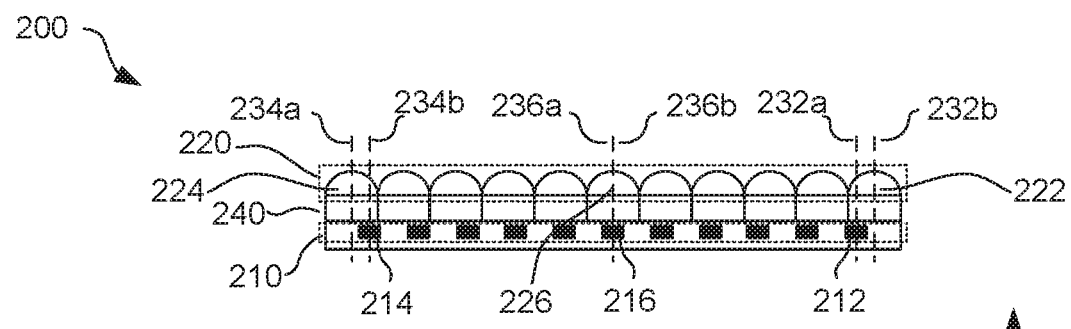
FIG. 2D illustrates a fingerprint sensing device, according to one or more embodiments.

FIG. 2D illustrates image sensing device 200 having an increased field of view. In the embodiment of FIG. 2D, the position of each of the sensing elements 210 is altered relative to a respective one of lenses 220. For example, sensing element 212 is laterally offset from lens 222; sensing element 214 is laterally offset from lens 224, altering the field of view of the sensing elements. Specifically, center line 232*a* of sensing element 212 is laterally offset from center line 232*b* of lens 222 in the negative X direction and center line 234*a* of sensing element 214 is offset from center line 234*b* of lens 224 in the positive X direction. In one embodiment, the differences between the center lines may be at least 0.5 um. In one or more embodiments, one or more of the sensing elements 210 may be laterally offset from a respective one of lenses 220 in the Y direction in addition or alternatively to the X direction.

Figure 2E:
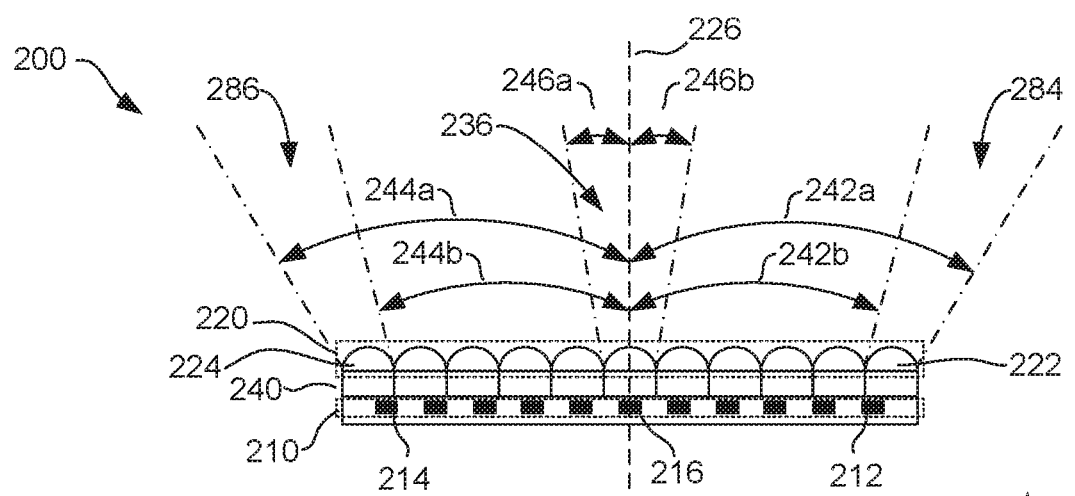
FIG. 2E illustrates a fingerprint sensing device, according to one or more embodiments.

FIG. 2E illustrates example field of views 232, 234, and 236 for sensing elements 212, 214, and 216. The field of view 284 corresponds to angles 242*a* and 242*b* with reference to center line 226 and field of view 286 corresponds to angles 244*a* and 244*b*. Further, the field of view of 236 corresponds to angles 246*a* and 246*b* with reference to center line 226. As can be seen from FIG. 2E, by offsetting sensing elements 214 and 212 from lenses 222 and 224, respectively, field of views 232 and 234 are altered such that the field of views of sensing elements 214 and 212 are offset from the center of each sensing element.

In one embodiment, the field of view of each sensing element may be substantially similar in size. For example, a size of field of view 284 may be substantially similar to a size of field of view 286 and a size field of view 236. In one embodiment, the difference between angles 242*a* and 242*b*, the difference between angles 244*a* and 244*b* and the difference between 246*a* and 246*b*, correspond to the size of each field of view and are substantially similar. For example, the difference between each adjacent angle, and the size of the corresponding field of views, may be about 15 degrees. In such an embodiment, angles 242*a* and 242*b* of field of view 284 may be about 30 degrees and about 45 degrees, respectively, angles 244*a* and 244*b* of field of view 286 may be about −30 degrees and about −45 degrees, respectively, and angles 246*a* and 246*b* of field of view 236 may be about −7.5 degrees and about 7.5 degrees, respectively.

In other embodiments, the offsets may be selected to produce angles having particular values. For example, the difference between angles, and the size of the field of views, may be about 10 degrees. In such an embodiment, angles 242*a* and 242*b* of field of view 284 may be about 20 degrees and about 30 degrees, respectively, angles 244*a* and 244*b* of field of view 286 may be about −20 degrees and about −30 degrees, respectively, and angles 246*a* and 246*b* of field of view 236 may be about −5 degrees and about 5 degrees, respectively. In other embodiments, the angles may differ by less than or more than 10 degrees.

In various embodiments, while FIG. 2E only illustrates the field of views for three sensing elements, sensing elements 212, 214, 216, the field of view for each of sensing elements 210 may be similarly altered by offsetting each sensing element with a corresponding lens. Further, the angles defining the field of view for each of the sensing elements between 216 and 212 may have a value that is between the values of angles 246*b* and 242*a*, and the angles defining the field of view for each of the sensing elements between 216 and 214 may have a value that is between the values of angles 244*a* and 246*a*. In one or more embodiments, the field of view for at least one sensing element overlaps with the field of view of another sensing element. The sensing area for image sensing device 200 corresponds to field of view of the outermost sensing elements, e.g., the sensing elements disposed closest to the perimeter of array of sensing elements 210. Accordingly, by increasing the field of view of sensing elements 210, the size of the sensing area is increased.

The amount that each of the sensing elements 210 is laterally offset from the center line of a corresponding one of lenses 220 may vary from sensing element 216 to sensing element 212 and 214, generating a gradient of field of views across the array of the sensing elements 210. In one embodiment, the amount the sensing elements 210 are offset from the center line of a corresponding one of lenses 220 increases from sensing element 216 to sensing element 212 and 214. For example, sensing elements closer to sensing elements disposed closer to sensing element 216 than sensing elements 212 or 214 may be laterally offset to a lesser degree than a sensing element disposed closer to sensing elements 212 or 214 than sensing element 216. In one embodiment, the sensing elements 212 and 214 may be disposed proximate a first and second edge of image sensing device 200 and sensing element 216 is disposed proximate a center of the image sensing device 200.

Figure 2F:
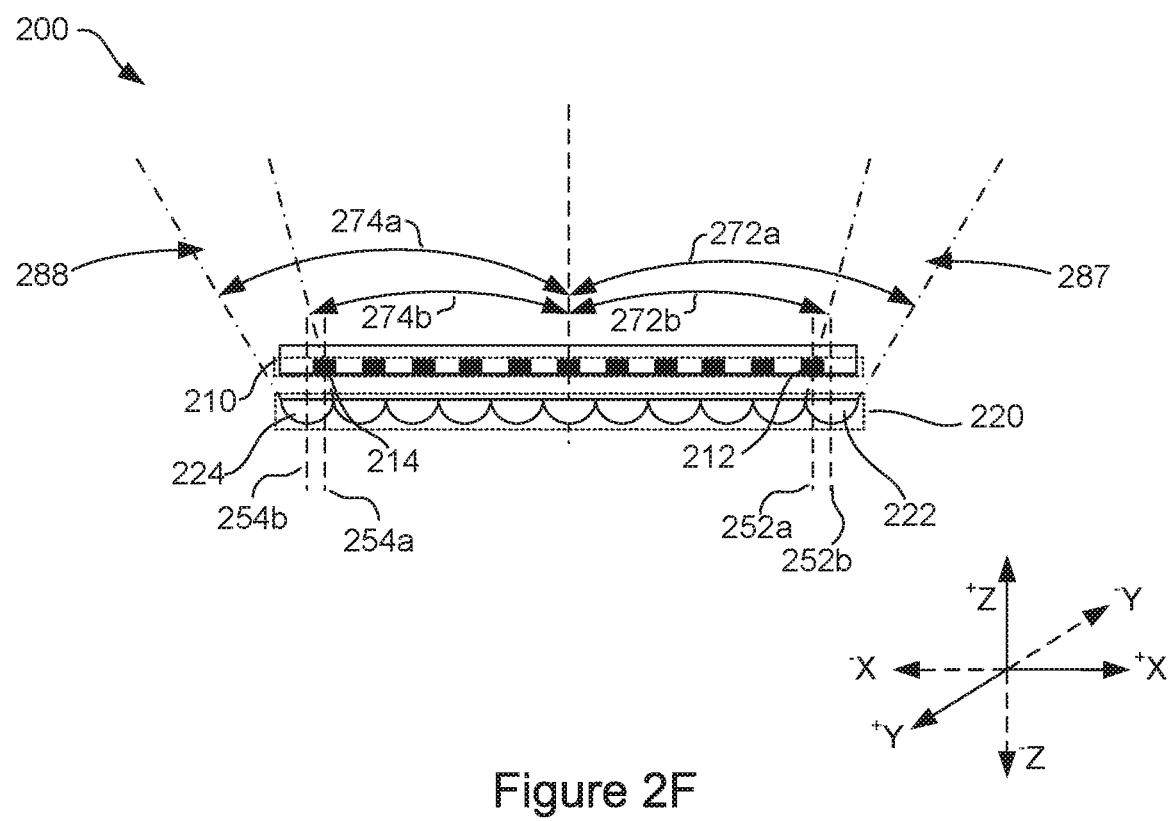
FIG. 2F illustrates a fingerprint sensing device, according to one or more embodiments.

FIG. 2F illustrates another embodiment of the image sensing device 200. As compared to the embodiment FIG. 2D, the lenses 220 of the embodiment of FIG. 2E are configured as reflective lenses and positioned below the sensing elements 210. For example, the lenses 220 are positioned such that the sensing elements 210 are positioned between an input surface and the lenses 220. In such a configuration, the lenses 220 are configured to reflect light received from above the sensing elements 210, back to the sensing elements.

Similar to that of the embodiments of FIGS. 2D and 2E, FIG. 2F illustrates sensing elements 210 laterally offset from a center point of the lenses 220. Further, such a configuration alters the field of view of the sensing elements, and may be utilized to increase the field of view of the sensing elements, and in turn, increase sensing area of the image sensing device 200. In one embodiment, the field of view 287 for the sensing element 212 corresponds to the angles 272a and 272b and the field of view 288 for the sensing element 214 corresponds to the angles 274a and 274b and both of the field of views have a field of view that is laterally offset from the center of sensing elements 212 and 214 and lens 222 and 224, respectively. For example, the field of view 287 is laterally offset from the center lines 252a and 252b of the sensing element 212 and the lens 222, respectively, and field of view 288 is offset from center points 254a and 254b of sensing element 214 and lens 224, respectively.

Figure 2G:
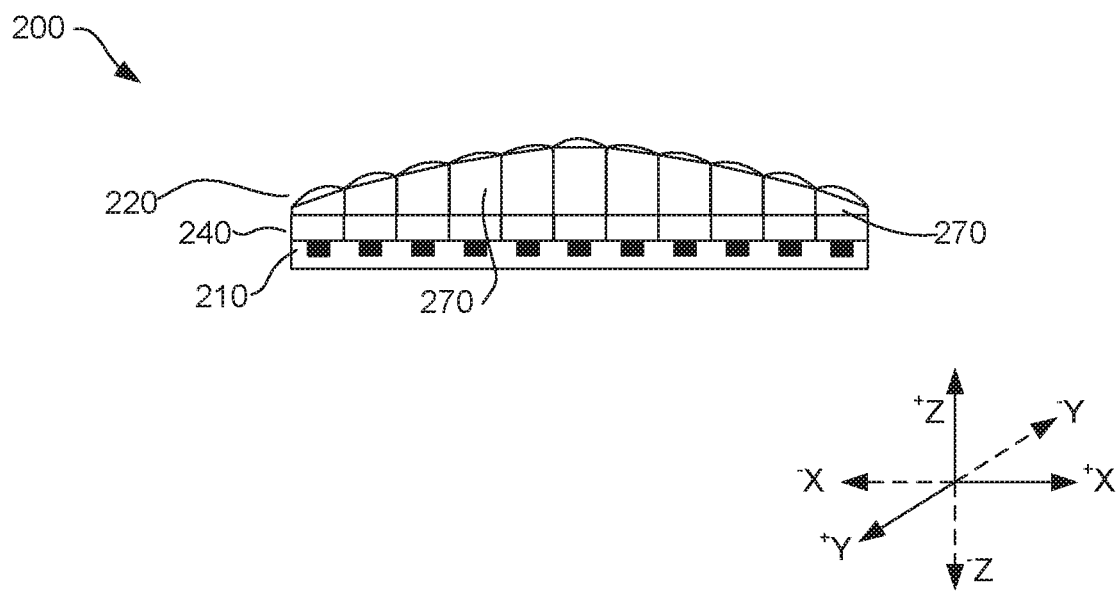
FIG. 2G illustrates a fingerprint sensing device, according to one or more embodiments.

FIG. 2G illustrates an alternative embodiment of image sensing device 200. As illustrated, each lens 220 is disposed at an angle relative to sensing elements 210 and to a surface of image sensing device 200. For example, lenses near proximate the center of the image sensing device 200 may be disposed at an angle of approximate 0 degrees while lenses proximate the edges of the image sensing device 200 may be disposed at an angle of about 45 degrees. In other embodiments, angles of less than or greater than about 45 degrees may be used. The angle that the lenses are mounted may gradually increase from those proximate the center of the image sensing device 200 to those mounted proximate the edge of the image sensing device 200. Lenses 220 may be mounted on the raised wedge-shaped portions 270 which are configured to position the lenses at the appropriate angle. For example, at least one surface of the raised wedge-shaped portions 270 may form an angle with a surface of the image sensing device 200. In one embodiment, the size of the angles associated with the raised wedge-shaped portions 270 may vary in the X direction, such that the angle decreases from each edge of the image sensing device 200 to a center region of the image sensing device 200.

Disposing the lenses 220 at an angle relative to sensing elements 210 alters the field of view of each sensing element, such that the field of view of a sensing element is laterally offset from the center from the sensing element. In one embodiment, the amount that the field of view is offset from the center of sensing elements 210 corresponds to the angle that each corresponding lens is disposed.

Figure 2H:
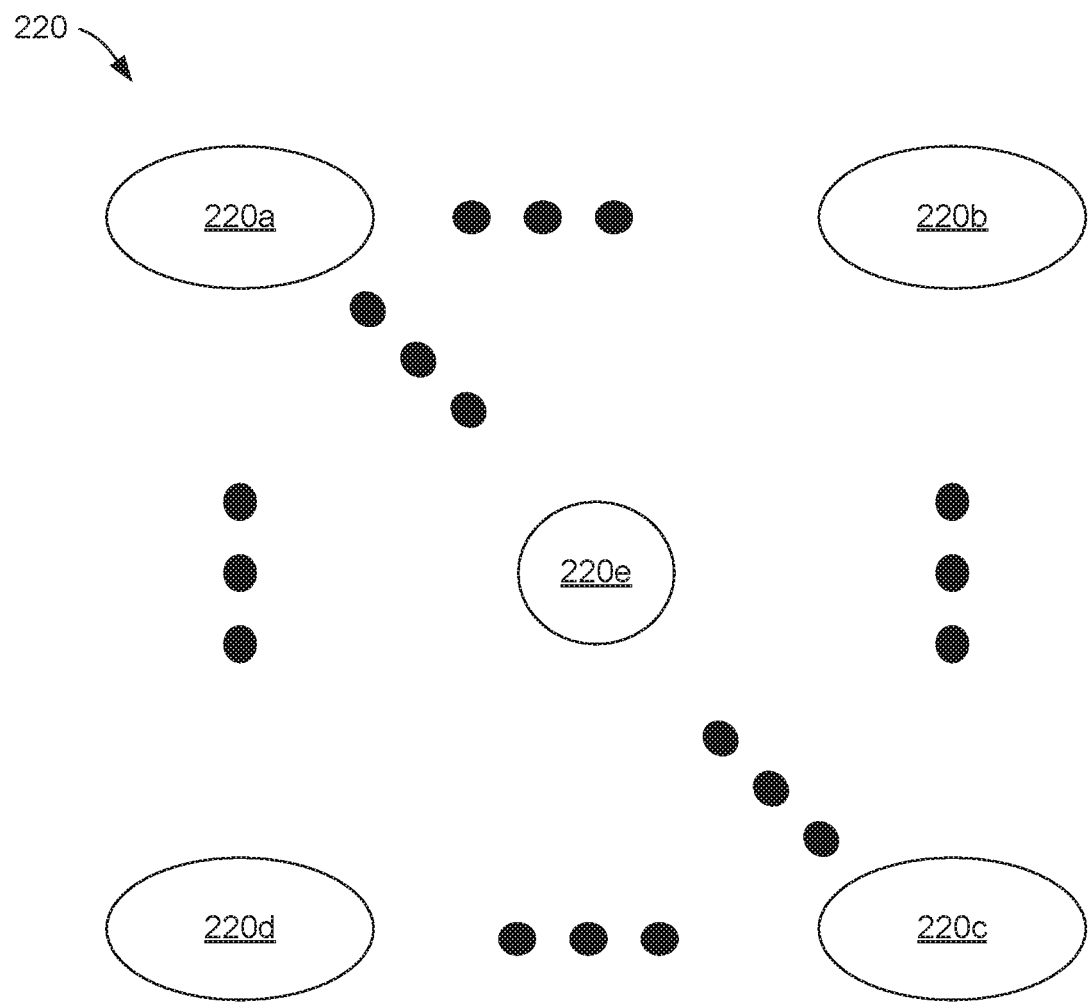
FIG. 2H illustrates a lens array of a fingerprint sensing device, according to one or more embodiments.

In other embodiments, the size and shape of the lenses may be varied to alter the field of view of a corresponding sensing element. For example, FIG. 2H illustrates a top view of an array of lenses 220. As is illustrated by FIG. 2H, the lenses 220a, 220b, 220c, and 220d have an elongated elliptical shape. Such a shape may be used to alter the field of view of each of the corresponding sensing elements as is described in relation to FIGS. 2D-2F. Further, the lens 220e, which is disposed proximate the array of lenses 220, comprises a circular shape. Such a shape may be utilized to ensure that that lens 220e doesn't alter the field of view of a corresponding sensing element. The shape of one or more lenses may differ from the shape of neighboring lenses. For example, the shape of one or more lenses 220a, 220b, 220d, 220c and 220e may differ from neighboring lenses, such that the field of view between neighboring sensing elements gradually changes in one of the X or Y direction. For example, lenses disposed closer to the center of the array will have a more circular shape similar to that of lens 220e and lenses disposed closer to the edges of the array will have a more elongated shape similar to that of lenses 220a-220d.

In various embodiments, one or more of lenses 220 may be gradient index (GRIN) lenses that are configured to alter the field of view of the lens and the field of view of a corresponding sensing element, e.g., sensing element 214. In one embodiment, the materials may be disposed in different layers. In other embodiments, a first material may be positioned within a first area of the lens and a second material may be positioned within a second area of the lens, creating a lens that is configured to shift the field of view of a corresponding sensing element. In one or more embodiments, the lenses 220 may be employ diffractive grating techniques to alter the field of view of the lens, and in turn, alter the field of view of a corresponding sensing element. Further, in one embodiment, gradients of different types of materials and/or different thicknesses of materials may be used to alter the field of view of the lens, and in turn, alter the field of view of a corresponding sensing element.

In one embodiment, varying the field of view for a sensing element may introduce artifacts into the sensing data received from the sensing elements, which may be manifested into fingerprint images generated from the sensing data. For example, the fingerprint images may experience vignetting and/or optical distortions. Vignetting may correspond to areas experiencing a reduction of brightness within a fingerprint image and optical distortions may correspond to compression and/or expansion of areas of the fingerprint image relative to each other. In one embodiment, the optical distortions may be similar to that of a fisheye lens that is commonly used in photography.

In one or more embodiments, one or more properties of lenses 220 may be altered to compensate for the artifacts. For example, the shape of lenses 220 which correspond to areas that experience optical distortions and/or vignetting may be altered to compensate for the optical distortions and/or vignetting. For example, one or more of lenses 220 may be elongated in a plane parallel to a plane of the surface of the image sensing device 200 and/or have an increased height (e.g., in a direction perpendicular to a plane of the surface of the image sensing device 200) to compensate for optical distortions and/or vignetting. In one embodiment, the one or more of lenses 220 may be configured differently than another of lenses 220 to apply different types of and/or amounts of compensation to each corresponding area of a fingerprint image. In one embodiment, the materials used to construct lenses 220 may be varied to correct for vignetting and/or optical distortions. In one or more embodiments, digital interpolation and compensation of pixelated images may be used to reduce the optical distortions and/or vignetting caused by the optical system (e.g., manufacturing variations, assembly variations, and bending of the device during use, among others). In one or more embodiments, to optimize the compensation calibration, images of known brightness variation (e.g. uniform brightness), and known spacing (e.g. evenly spaced in one or more dimensions) may be displayed by the display and imaged with an image sensing device 200 through the distortion and used by the image sensing device 200 to estimate the proper correction.

Lenses 220 may be printed onto a substrate or molded onto a substrate. In one or more embodiments, lenses 220 may be diffractive lenses. In yet other embodiments, the lenses 220 may be refractive lenses. For example, lenses 220 may be lenticular lenses which may be formed by lenticular printing.

In one embodiment, lenses 220 may be configured to focus light of a certain wavelength. For example, lenses 220 may be configured to focus green light, blue light or red light. In such an embodiment, the color of light that is used to illuminate a user's finger may correspond to the color of light that the lens is configured to focus. In other words, the lens is configured to focus a predefined wavelength or wavelengths of light. Further, in one or more embodiments, the lenses 220 my act as an absorber or filter for other wavelengths of light outside the predefined wavelength.

In one embodiment, only a portion of the sensing elements of image sensing device 200 may be utilized for fingerprint sensing. For example, sensing elements that are located a specified distance from the center line of a corresponding lens may be utilized, generating a corresponding field of view for the sensing elements.

Figure 3:
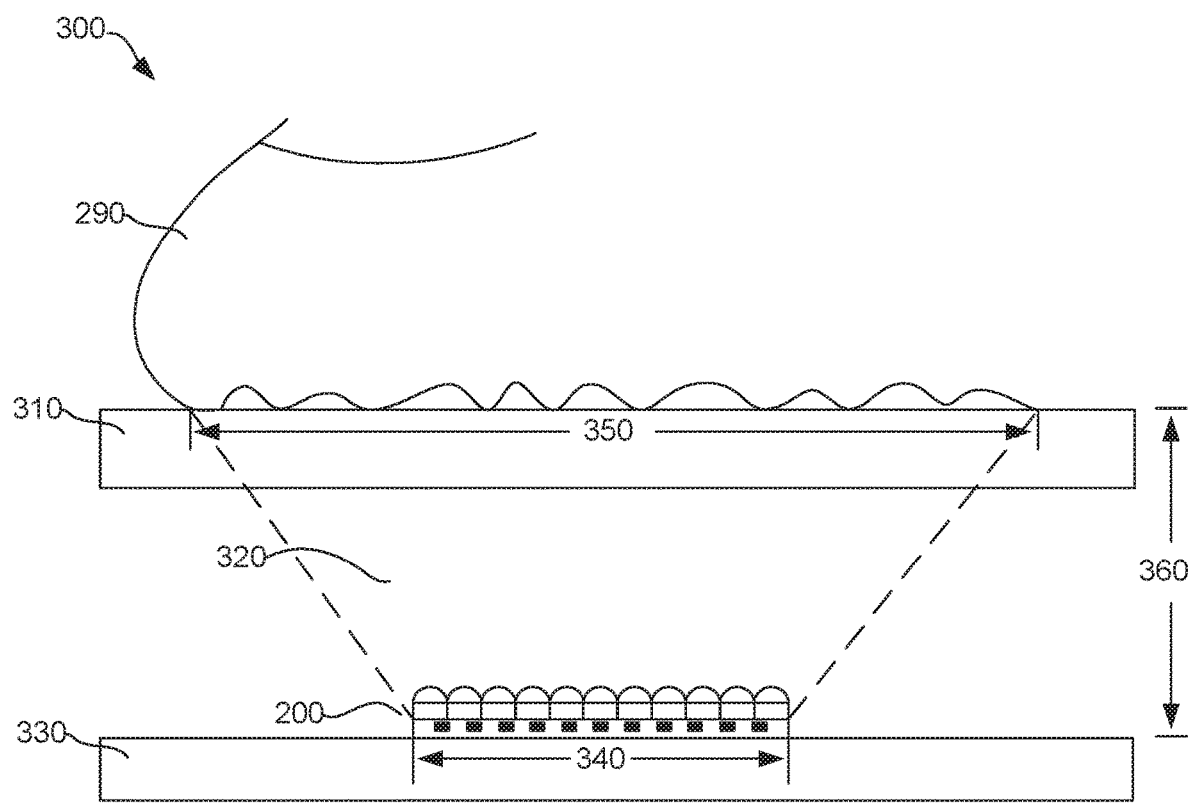
FIG. 3 illustrates an electronic device, according to one or more embodiments.

FIG. 3 illustrates an embodiment of input device 300 comprising display device 310 and image sensing device 200. In one embodiment, image sensing device 200 is mounted to a portion of frame 330 of input device 300. In other embodiments, the image sensing device 200 may be mounted to one or more layers of display device 310. Further, image sensing device 200 may be configured to obtain sensor data that corresponds to the portion of the fingerprint of input object 290 that is within field of view 320. Expanding the field of view allows the fingerprint sensing device to capture more of the fingerprint. Further, expanding the field of view provides for a sensing area that is greater than the area of the image sensing device 200. For example, sensing area may have a width 350 that is greater than width 340 of the fingerprint sensing device.

The sensor data corresponds to the reflected light received by image sensing device 200 which is reflected by features of a user's fingerprint. For example, the reflected light may corresponds to light that is reflected by valleys and/or ridges of a fingerprint. The reflected light is outputted as sensor data which may be processed to generate a fingerprint image and determine the features of the fingerprint. In one or more embodiments, one or more portions of the fingerprint image may be compensated and corrected for distortions or vignetting prior to determining the features or matching the fingerprint.

Figure 4:
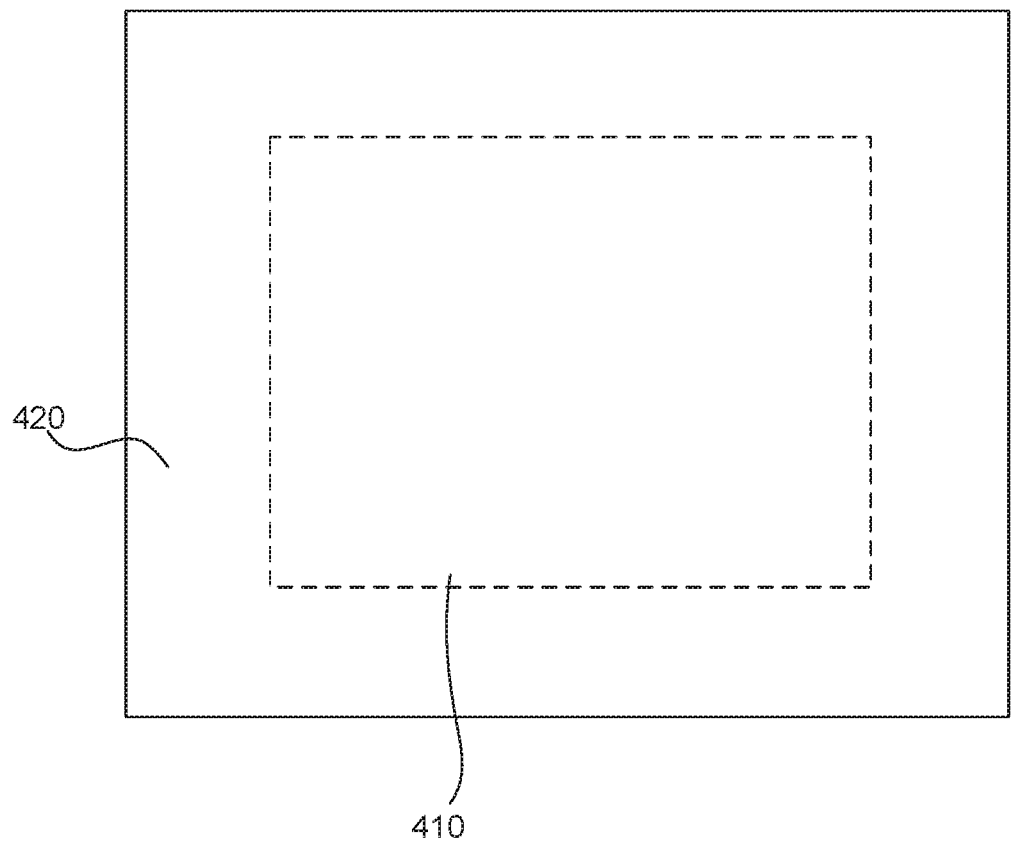
FIG. 4 illustrates a top view of a sensing area and a fingerprint sensing device area, according to one or more embodiments.

FIG. 4 illustrates a comparison of sensing area 420 to the area 410 of a fingerprint sensing device, fingerprint sensing device 100. As is illustrated sensing area 420 is greater than area 410. Further, the size of sensing area 420 may correspond to the field of view of the sensing elements, e.g., sensing elements 210. In various embodiments, the shape of sensing area 420 corresponds to the shape of area 410 of the fingerprint sensing device. In one embodiment, the size of sensing area 420 further corresponds to the distance between the fingerprint sensing device and the sensing surface, e.g., distance 360. For example, by increasing distance 360, the size of the sensing area 420 may be increased. In one embodiment, distance 360 is between about 0.1 mm to about 5 mm.

Figure 5:
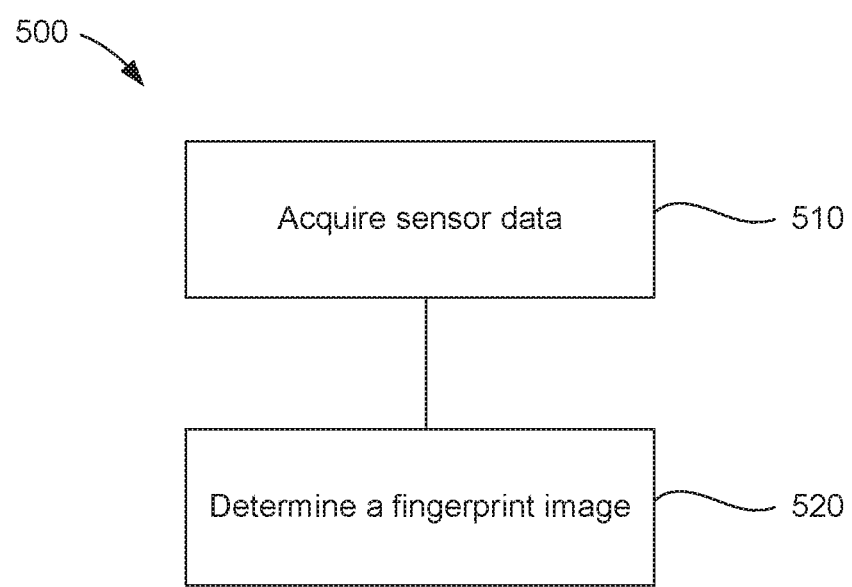
FIG. 5 illustrates a method for fingerprint sensing, according to one or more embodiments.

FIG. 5 illustrates a method 500 for determining a fingerprint image using sensor data received from a fingerprint sensing device, such as image sensing device 200. At step 510 sensor data is acquired from a fingerprint sensor. For example, the sensor data may be acquired from sensor 120 by sensor module 112 of processing system 110. In one embodiment, sensor 120 includes a sensing area that is larger than the area of the sensing device. In such an embodiment, one or more of the sensing elements of the sensing device may have an altered field of view and is configured to receive light reflected from sources outside the projection of lateral boundaries of the sensor 120. For example, the projection of lateral boundaries may extend beyond an area that extends upward from the perimeter of the sensor 120. In one embodiment, sensor 120 is an imaging device comprising an array of sensing elements, e.g. photodetectors, which are configured to convert received light into a current signal. The current signals may be referred to as resulting signals. Sensor module 112 may be configured to sequentially select rows, columns or other groups of sensing elements to obtain the current signal from each sensing element, and process the current signal. In one embodiment, sensor module 112 is configured to generate a value representing the current level of the current signal. In one embodiment, sensor module 112 may include a plurality of analog front ends configured to receive the current signals and covert the current signals to a voltage level. In other embodiments, the current signals may be directly measured. The voltage level may be an analog signal which is converted by an analog-to-digital converter (ADC) of the sensor module 112 to a digital voltage value.

At step 520, a fingerprint image is determined from the processed sensor data. For example in one embodiment, sensor module 112 is configured to generate a fingerprint image from the processed sensor data for each sensing element. In one embodiment, the processed sensor data is converted into a two dimensional fingerprint image representing the amount of received light at each sensing element. Each pixel of the fingerprint image may correspond to a different sensing element. In one or more embodiments, one or more filtering techniques may be applied to processed sensor data before it is converted into a two dimensional fingerprint image.

In one embodiment, the processing system 110 may use the enrollment templates of template storage 114 to authenticate a user. For example, the processing system 110 may perform matching (e.g., comparison of the captured fingerprint against enrollment template) and, if necessary, wake the host after a successful fingerprint authentication.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" are used as the plain-English equivalents of the respective terms "comprising" and "wherein." Moreover, in the following claims, the terms "first," "second," and "third," etc. are used merely as labels, and are not intended to impose numerical requirements on their objects.

What is claimed is:

1. A fingerprint sensor comprising:
   an image sensing device comprising:
   a plurality of reflective lenses; and
   a plurality of sensing elements disposed above the plurality of reflective lenses comprising:
     a first sensing element having a field of view associated with a first lens of the plurality of lenses and laterally offset from a center of the first lens; and
     a second sensing element having a field of view associated with a second lens of the plurality of lenses and laterally offset from a center of the second lens.

2. The fingerprint sensor of claim 1, wherein the first sensing element is disposed laterally offset from the center of the first lens and the second sensing element is disposed laterally offset from the center of the second lens.

3. The fingerprint sensor of claim 1, wherein the plurality of sensing elements further comprises a third sensing element having a field of view associated with a third lens of the plurality of lenses and aligned with a center of the third lens.

4. The fingerprint sensor of claim 1, wherein the field of view of the first sensing element extends laterally beyond a first edge of the image sensing device, and the field of view of the second sensing element extends laterally beyond a second edge of the image sensing device.

5. The fingerprint sensor of claim 4, wherein a size of the field of view of the first sensing element and a size of the field of view of the second sensing element are substantially equal.

6. The fingerprint sensor of claim 5, wherein the field of view of the first sensing element and the field of view of the second sensing element each corresponds to a first angle and a second angle about a center line of the image sensing device, the first angle of the field of view of the first sensing element is no less than −45 degrees about the center line and the first angle of the field of view of the second sensing element is no greater than 45 degrees about the center line, and wherein a difference between the first angle and the second angle of the field of view of the first sensing element and a difference between the first angle and the second angle of the field of view of the second sensing element does not exceed about 15 degrees.

7. The fingerprint sensor of claim 1, wherein the fingerprint sensor further comprises a sensing area, and the sensing area is greater than a surface area of the image sensing device.

8. The fingerprint sensor of claim 1, wherein the first lens is disposed at a first angle relative to a surface of the image sensing device and the second lens is disposed at a second angle relative the surface of the image sensing device.

9. The fingerprint sensor of claim 1, wherein at least one of a shape and a size of the first lens is configured to generate at least one of an angle and size of the field of view of the first sensing element, and at least one of a shape and a size of the second lens is configured to generate at least one of an angle and size of the field of view of the second sensing element.

10. An input device comprising:
a display device comprising a plurality of light emitting diodes (LEDs); and
a fingerprint sensor comprising:
an image sensing device comprising:
a plurality of reflective lenses; and
a plurality of sensing elements disposed above the plurality of reflective lenses comprising:
a first sensing element having a field of view associated with a first lens of the plurality of lenses and laterally offset from a center of the first lens; and
a second sensing element having a field of view associated with a second lens of the plurality of lenses and laterally offset from a center of the second lens.

11. The input device of claim 10, wherein the fingerprint sensor further comprises a processing system configured to:
operate the image sensing device to acquire a fingerprint image; and
authenticate a user at least partially based on the fingerprint image.

12. The input device of claim 10, wherein the first sensing element is disposed laterally offset from the center of the first lens and the second sensing element is disposed laterally offset from the center of the second lens.

13. The input device of claim 10, wherein the plurality of sensing elements further comprises a third sensing element having a field of view associated with a third lens of the plurality of lenses and aligned with a center of the third lens.

14. The input device of claim 10, wherein the field of view of the first sensing element extends beyond a first edge of the image sensing device, and the field of view of the second sensing element extends beyond a second edge of the image sensing device.

15. The input device of claim 14, wherein a size of the field of view of the first sensing element and a size of the field of view of the second sensing element are substantially equal.

16. The input device of claim 10, wherein the fingerprint sensor further comprises a sensing area, the sensing area is greater than an area of the image sensing device.

17. The input device of claim 10, wherein the first lens is disposed at a first angle from a surface of the image sensing device and the second lens is disposed at a second angle from the surface of the image sensing device.

18. The input device of claim 10, wherein at least one of a shape and a size of the first lens is configured to generate at least one of an angle and size of the field of view of the first sensing element, and at least one of a shape and a size of the second lens is configured to generate at least one of an angle and size of the field of view of the second sensing element.

19. A method for operating a fingerprint sensor, the method comprising:
acquiring sensor data from an image sensing device of the fingerprint sensor, wherein the image sensing device comprises:
a plurality of reflective lenses; and
a plurality of sensing elements disposed above the plurality of reflective lenses comprising:
a first sensing element having a field of view associated with a first lens of the plurality of lenses and laterally offset from a center of the first lens; and
a second sensing element having a field of view associated with a second lens of the plurality of lenses and laterally offset from a center of the second lens.

20. The method of claim 19, wherein the first sensing element is disposed laterally offset from the center of the first lens and the second sensing element is disposed laterally offset from the center of the second lens.

* * * * *